July 14, 1936.   G. HAGLUND   2,047,628
APPARATUS FOR PRODUCING SOLUTIONS
Original Filed Jan. 12, 1933   3 Sheets-Sheet 1
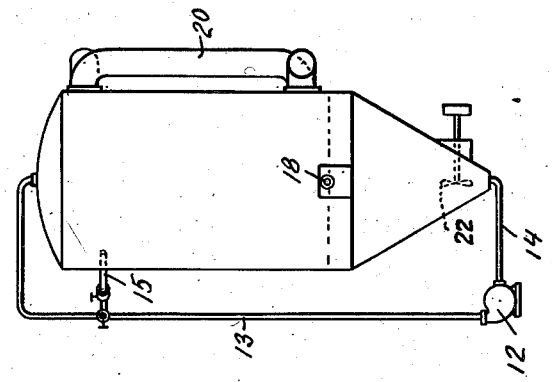
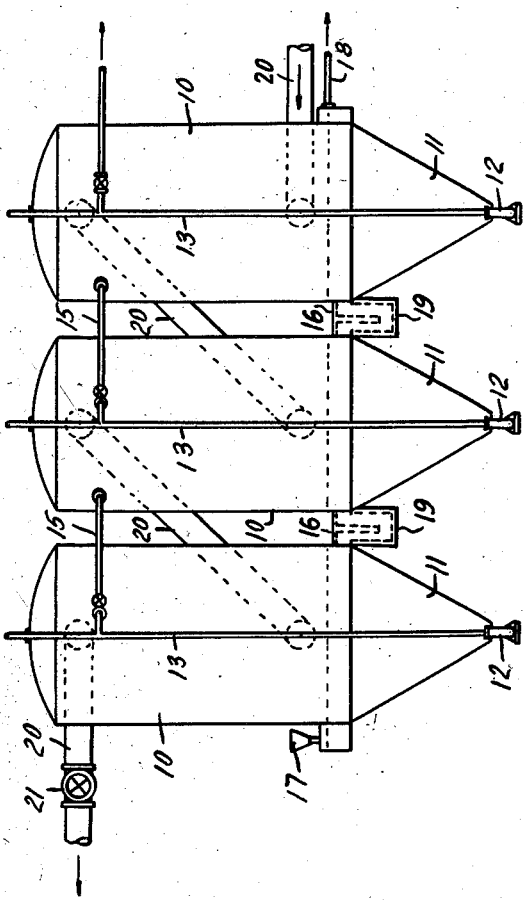
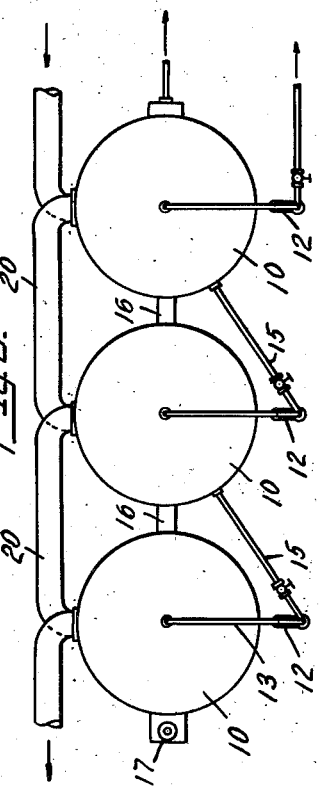
INVENTOR
Gustaf Haglund
BY
ATTORNEYS July 14, 1936.　　　　G. HAGLUND　　　　2,047,628
APPARATUS FOR PRODUCING SOLUTIONS
Original Filed Jan. 12, 1933　　3 Sheets-Sheet 2
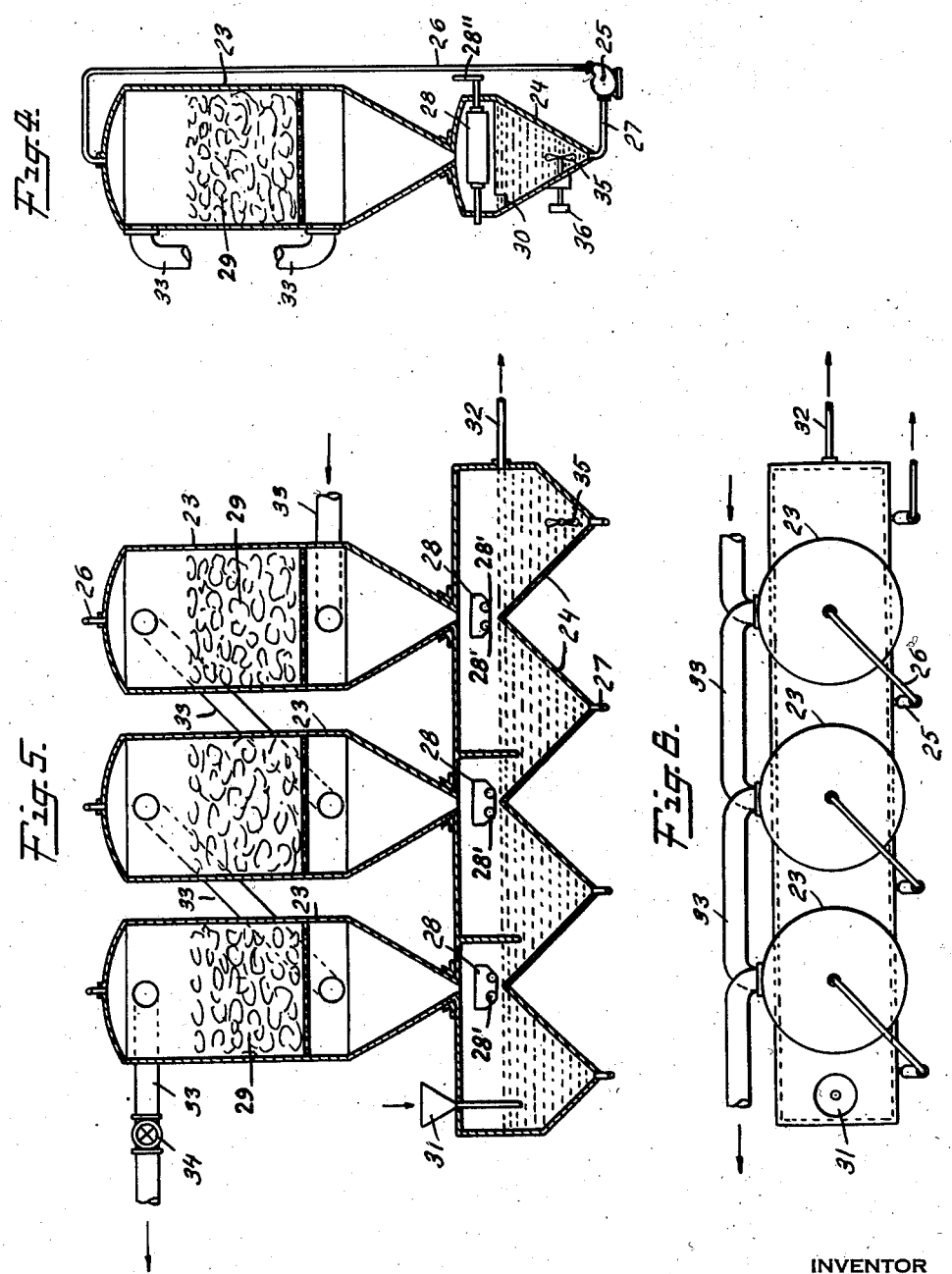
INVENTOR
Gustaf Haglund
BY
Pennie, Davis, Marvin & Edmonds
ATTORNEYS July 14, 1936.  G. HAGLUND  2,047,628
APPARATUS FOR PRODUCING SOLUTIONS
Original Filed Jan. 12, 1933   3 Sheets-Sheet 3

INVENTOR
Gustaf Haglund
BY
Pennie, Davis, Marvin & Edmonds
ATTORNEYS

Patented July 14, 1936

2,047,628

UNITED STATES PATENT OFFICE 2,047,628

APPARATUS FOR PRODUCING SOLUTIONS

Gustaf Haglund, Stockholm, Sweden, assignor to Patentaktiebolaget Gröndal-Ramen, Stockholm, Sweden Original application January 12, 1933, Serial No. 651,244. Divided and this application October 20, 1933, Serial No. 694,393. In Sweden March 12, 1932

9 Claims. (Cl. 261—21)

This invention relates to the production of solutions and has for an object the provision of improved apparatus for producing solutions. More particularly, the invention contemplates the provision of improved apparatus for use in processes involving the absorption of gases in liquids.

The apparatus of the invention comprises two or more reaction chambers, and means for passing gas and liquid therethrough in countercurrent relationship and in contact with each other. The preferred form of apparatus of the invention is provided with means for circulating the liquids in the reaction chambers at different rates.

The apparatus of the invention is particularly suitable for use in the production of bisulphite solutions in accordance with the process of the invention described in my copending application Serial No. 651,244, filed January 12, 1933, of which the present application is a division. The apparatus of the present invention, therefore, will be described hereinafter with particular reference to its use in carrying out a process of the type described in my aforementioned copending application.

According to the process of the invention described in my aforementioned copending application, a current of sulphur dioxide gas is passed in contact with a counter-current flow of a suspension of lime in water or in a suitable salt solution. The sulphur dioxide and lime suspension are preferably circulated through two or more absorption or reaction chambers or towers in series. The lime is sufficiently finely divided that it may be maintained readily in suspension during the course of the process, and the suspension comprising finely divided lime and liquid may be easily circulated, for example, by means of pumps. In the preferred process, lime and suspension liquor are introduced and the finished liquor is withdrawn at the same rate.

According to the present invention, favorable absorption or reaction conditions are obtained— (1) by providing means for circulating the lime suspension through each separate reaction chamber as many times and at such a velocity as may be required by the special conditions prevailing within the chamber; and (2) by providing means for regulating or adjusting the supply of suspension from one chamber to another. The circulation of the suspension or the liquid through any chamber can, if necessary or desirable, take place at a velocity many times greater than through any other chamber, and, also, the quantities of liquor that are brought in circulation through the various chambers can differ between themselves and vary according to the requirements. The lime suspension or lime and suspension liquor that is continuously supplied to the apparatus can be distributed and kept in circulation in the manner described in varying quantities in the separate chambers, without influencing the continuous flow of finished solution of bisulphite from the apparatus, whereby a continuous working is insured.

The sulphur dioxide may be caused to flow through the reaction chambers by any suitable means. Thus, a fan may be provided for creating suction to draw the gas through the chambers, or the gas may be introduced into the chambers under pressure. The latter procedure is preferred because it is possible thereby to increase the absorption velocity for sulphur dioxide and thus increase the reaction velocity. The sulphur dioxide gas is passed through the apparatus according to the countercurrent principle, as has already been explained, and the gas when entering the apparatus, consequently, first comes into contact with bisulphite solution which is in a practically finished state, and which contains only very small quantities of unconverted lime and then passes through the other reaction chambers meeting the lime suspension which contains ever increasing quantities of lime.

The invention will be better understood from a consideration of the accompanying drawings in which are shown several preferred embodiments of the invention, and in which Fig. 1 is an end elevation of a form of apparatus comprising three cylindrical containers or towers arranged at the same elevation and each provided with a separate conical collecting chamber for liquor;

Fig. 2 is a side elevation of the apparatus illustrated in Fig. 1;

Fig. 3 is a plan view of the apparatus shown in Fig. 2;

Figs. 4 and 5 are respectively end and side elevations in section of apparatus similar to the apparatus illustrated in Figs. 1 and 2, but in which interconnected collecting chambers for the liquor are disposed below the containers or towers;

Fig. 6 is a plan view of the apparatus shown in Figs. 4 and 5; and

Figure 7:
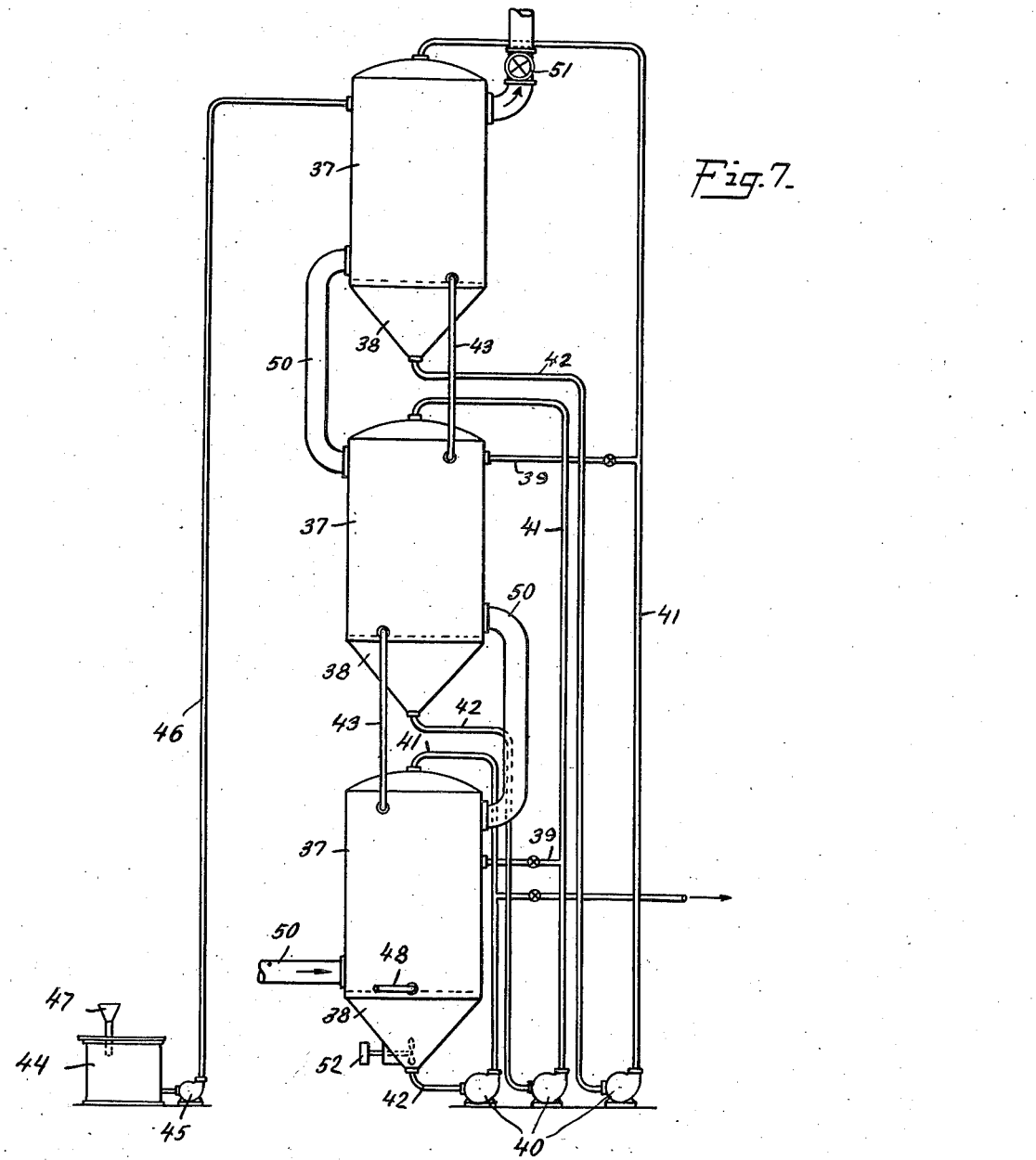
Fig. 7 is an elevation of apparatus similar to that shown in Figs. 1 to 3 but in which the cylindrical containers or towers are arranged at different elevations.

The apparatus illustrated in Figs. 1 to 3 comprises three similar units each comprising a cylindrical tower or container. The upper part 10 of each tower or container is arranged as an absorption reaction chamber which can be conveniently filled with rings, coke or pumice lumps or any other suitable packing material for obtaining a large surface in order to facilitate the reactions between the added materials, and the lower part 11 of which, being conically shaped, is a collecting and concentrating chamber for the liquid or the liquor with suspended solid substances.

Each unit is provided with a circulating system comprising a pump 12 and pipes 13 and 14 connecting the upper portion of the reaction chamber and the lower portion of the collecting chamber with the pump.

For transporting the liquid or suspension from one container to another, branch pipes 15 provided with suitable valves are arranged which connect the pipes 13 and the upper part of the reaction chamber 10 of the adjacent container.

The collecting chambers are connected by means of conduits 16 and traps 19 to permit the flow of liquor from one collecting and concentrating chamber to another so that the level of liquor in all collecting and concentrating chambers will be equally high, independent of the special circulation conditions prevailing in the separate collecting and concentrating chambers and the reaction chambers.

For the supplying of liquid and solid agents such as water and lime, funnel-shaped pipes 17 or the like are provided, and pipes 18 are provided for the flowing off of the finished liquor. The gas such as sulphur dioxide is supplied through a large pipe or conduit 20 which communicates with the lower portion of the reaction chamber of the last container of the battery (where the solution or suspension leaves the battery), and from the upper part of this chamber passes to the lower part of the reaction chamber of the container next before, and in this way proceeds through the battery. In the pipe 20 from the first container of the battery a valve 21 is arranged for regulating the gas pressure, in case the gas is added under pressure.

Under certain conditions it may be desirable to have an extra stirring arrangement, for instance a propeller or the like, in the lower part of the collecting and concentrating chambers, which can serve as an auxiliary medium in addition to the pump, for keeping solid substances in suspension. Such an arrangement may be particularly desirable in the last container of the battery from which the finished solution is drawn. For this reason, a stirring device 22 is arranged in the last collecting chamber of the battery. Stirring devices may also be arranged in the other collecting chambers.

The apparatus illustrated in Figs. 4 to 6 also comprises a battery of three similar units each comprising a cylindrical container or reaction chamber 23 which may be filled with suitable packing material 29 as in the case of the apparatus illustrated in Figs. 1 to 3. Collecting and concentrating chambers 24 are disposed directly below and in direct communication with the reaction chambers. Each unit is provided with a circulating system comprising a pump 25 and pipes 26 and 27 connecting an upper portion of a reaction chamber and a lower portion of a collecting and concentrating chamber with the pump. The collecting and concentrating chambers are provided with distributing devices 28 comprising a trough arranged pivotally and provided with holes 28' and a handle 28''. By means of these distribution devices the suspension leaving a reaction chamber can be distributed to the adjacent collecting and concentrating chambers in any desired proportion. That portion of the suspension which is supplied to the collecting and concentrating chamber to the left of the corresponding reaction chamber (Fig. 5) is then again circulated through the same reaction chamber. The portion supplied to the collecting chamber to the right, on the other hand, is circulated through the next reaction chamber of the battery, or, in the case of the last chamber, is drawn off from the battery. Consequently, the distributing devices 28 serve the same purpose as the branch pipe 15 in Figs. 1–3.

The collecting and concentrating chambers are connected by means of conduits 30 to permit the flow of liquid from one collecting and concentrating chamber to another so that the liquid level will be the same in all chambers. A funnel-shaped pipe 31 is provided for introducing liquids and solids, and a discharge pipe 32 is provided for withdrawing the finished liquor. The gas is supplied through a large pipe or conduit 33 arranged to conduct the gas through all of the reaction chambers in series, the gas entering each chamber at the bottom and leaving at the top. A valve 34 is provided for regulating the gas pressure. The last collecting and concentrating chamber 24 of the series is provided with a stirring device comprising a suitable shaft having a propeller 35 and a pulley 36 mounted thereon. The pulley may be connected with a suitable source of power (not shown).

The apparatus shown in Fig. 7 comprises a battery of three similar units, each including a cylindrical tower or container similar to the towers of the apparatus illustrated in Figs. 1 to 3. The cylindrical towers of the different units are mounted at different elevations, one above another. The upper part 37 of each tower is filled with suitable packing material, and the lower conical part 38 forms a collecting chamber for the liquid.

Each unit is provided with a circulating system comprising a pump 40 and pipes 41 and 42 connecting the upper portion of the reaction chamber and the lower portion of the collecting and concentrating chamber with the pump. Branch pipes 39 connecting the pipes 41 with the upper part of the reaction chamber of the adjacent container and having suitable valves therein are provided for conducting liquid from one container to another. Overflow pipes 43 are provided for conducting liquid from the uppermost and intermediate collecting and concentrating chambers to the upper portions of the intermediate and lowermost reaction chambers to maintain the liquid in the different collecting chambers at the same levels.

Liquid is introduced into the system from a supply tank 44 by means of a pump 45 and a conduit 46 connected with the upper portion of the uppermost reaction chamber. A funnel-shaped conduit 47 is provided for introducing the liquid into the supply tank. A pipe 48 connected with the upper portion of the lowermost collecting and concentrating chamber is provided for withdrawing finished liquor.

The gas is supplied through large conduits 50 arranged to conduct the gas through all of the reaction chambers in series, the gas entering each chamber at the bottom and leaving at the top. A valve 51 is provided for regulating the gas pressure.

The last collecting and concentrating chamber in the series is provided with a stirring device 52 similar to that provided in the apparatus illustrated in Figs. 1 to 6.

Apparatus of the type illustrated in Figs. 1 to 3 may be employed for producing bisulphite solution in the following manner. Through the funnel 17, water or liquor from which the bisulphite solution is to be formed, and also a quantity of finely crushed lime or quick lime, proportional to the desired composition of the bisulphite solution, is added so that the water or the solution with the suspended lime will fill the first collecting and concentrating chamber 11. From the collecting and concentrating chamber the suspension is forced through the pipes 13 and 14 by means of the pump 12 to the upper part of the first absorption or reaction chamber 10 and then flows downwardly through the chamber which, as hereinbefore pointed out, is preferably filled with filling material of some kind, and then returns to collecting and concentrating chamber 11. During the course of its downward passage through the reaction chamber, the suspension meets ascending sulphur dioxide gas, introduced through the pipe 20, which is absorbed in the liquor and reacts with the substances dissolved or suspended in the liquor.

While passing upwardly through the piping 13, part of the suspension is directed through the branch pipe 15 to the second container of the battery. The suspension entering the second container is circulated by means of the pump and piping associated therewith, and, during the course of such circulation, a portion of the suspension passes through the second branch pipe 15 to the last container of the battery, from which the finished bisulphite solution is continuously withdrawn through the outlet 18 along with lime that may not have been consumed, or with suspended insoluble substances formed, which afterward settle in a settling tank outside the apparatus (not shown).

The quantity of suspension passing from one container to another is determined by the special conditions in each container. In the container into which the suspension is first introduced it is exposed to the influence of a sulphur dioxide gas with a comparatively small concentration of sulphur dioxide. The remaining sulphur dioxide is therefore comparatively easily absorbed in the added suspension, and consequently, the suspension from this container is comparatively rapidly directed to the next container and brought in contact here with a stronger sulphur dioxide gas. Suitable valves are provided in the branch pipes 15, as indicated, to control the flow therethrough.

On account of the communicating connections between the collecting and concentrating chambers (conduits 16) such a flow of suspension from one container to another does not cause any rise of the level of liquor in the collecting and concentrating chamber of the last named container—the level of the liquor being kept at the same height in all the containers. In order to prevent the gas from passing through the connection conduits 16, those conduits are provided with traps 19.

As all the collecting and concentrating chambers communicate with one another, the quantity of liquor which is continuously flowing from the last container of the battery will naturally be equal to the quantity which is being added at the inlet end of the apparatus, also in a continuous manner, hence it is evident that the circulation velocity of the separate containers has no influence on the quantity of liquor flowing from the apparatus.

The operation of apparatus of the type illustrated in Figs. 4 to 7 will be clear from a consideration of the operation of apparatus of the type illustrated in Figs. 1 to 3.

In the operation of apparatus of the type illustrated in Fig. 7 for the purpose of producing bisulphite solution, a suspension of lime in water or a salt solution is introduced by means of the pump 45 and the piping associated therewith from the supply tank 44 into the upper portion of the uppermost reaction chamber 37. When the liquor in the uppermost collecting and concentrating chamber 38 has reached a certain level, the suspension flows through the uppermost pipe 43 to the reaction chamber of the container lying immediately below, and, in the same way, from the collecting and concentrating chamber 20 of this container to the lowermost container. In other respects, the operation of the apparatus is the same as the operation of the apparatus illustrated in Figs. 1 to 6.

It is to be understood that in the design of the apparatus described and the combination of the various parts, such alterations or modifications may be undertaken as do not influence the fundamental principle of the apparatus and which are in agreement with the scope of the invention.

I claim:

1. Apparatus of the class described comprising a battery of two or more towers or containers each including an upper absorption or reaction chamber and a lower collecting and concentrating chamber, means for introducing suspension into one or more of the collecting and concentrating chambers, means providing for the passage of suspension directly from one collecting and concentrating chamber to another, means for circulating concentrated suspension from the lower portion of one or more collecting chambers through one or more reaction chambers associated therewith, means associated with the circulating means for transferring concentrated suspension from one or more containers to one or more other containers, and means for passing a gas through the reaction chambers in series countercurrent to the direction of flow of circulating suspension therein.

2. Apparatus according to claim 1, characterized in that one or more of the collecting and concentrating chambers is provided with a stirring device.

3. Apparatus of the class described, comprising a plurality of reaction chambers, a plurality of collecting and concentrating chambers associated with the lower portion of the reaction chambers, conduits providing means of communication between the interiors of the reaction chambers and the interiors of the collecting and concentrating chambers, means for circulating liquid from the collecting and concentrating chambers to an upper part of the associated reaction chambers whereby it will flow downwardly through the reaction chambers back into the collecting and concentrating chambers, means providing for the distribution between adjacent collecting and concentrating chambers of the liquid flowing downwardly through each reaction chamber, and means for passing a gas through the reaction chambers in series countercurrent to the direction of flow of circulating liquid therein.

4. Apparatus of the class described, comprising a battery of two or more sections, each section comprising a reaction chamber and a substantially conical shaped collecting and concentrating chamber associated with the lower part of the reaction chamber, means for introducing suspension into at least one of the sections, means for transporting relatively concentrated suspension from the lower portions of the collecting and concentrating chambers partly back to the tops of the reaction chambers associated therewith and partly to the adjacent sections of the battery, means providing for the flowing of relatively dilute suspension from the upper portions of the collecting and concentrating chambers through these collecting and concentrating chambers in series and having therein traps to prevent the flow of gas therethrough, and means providing for the passage of gas through the reaction chambers in series in contact with the suspension flowing therethrough.

5. Apparatus according to claim 4, characterized in that the sections are arranged at substantially the same elevation and that the means for transport of suspension from the lower portions of the collecting and concentrating chambers comprises pumps or the like and conduits leading to the upper portions of the reaction chambers associated therewith and branch conduits leading to the adjacent sections.

6. Apparatus according to claim 4, characterized in that the sections are arranged one above the other and that the means for transport of suspension from the lower portions of the collecting and concentrating chambers comprises pumps or the like and conduits leading to the upper portions of the reaction chambers associated therewith and branch conduits leading to the adjacent sections.

7. Apparatus according to claim 4, characterized in that the sections are arranged at substantially the same elevation and that the means for transport of suspension from the lower portions of the collecting and concentrating chambers to the reaction chambers associated therewith and to the adjacent sections comprises distributing devices placed below the reaction chambers by means of which distributing devices suspension passing from one reaction chamber can be passed partly to one collecting and concentrating chamber and partly to another collecting and concentrating chamber and conduits communicating between the lower portions of the different collecting and concentrating chambers and the upper portions of the reaction chambers associated therewith, said conduit being provided with means for inducing a flow through the conduits from the settling chambers.

8. Apparatus of the class described, comprising a plurality of reaction chambers, a plurality of collecting and concentrating chambers associated with the reaction chambers, means for introducing a liquid into the collecting and concentrating chambers, means providing for the passage of liquid through the collecting and concentrating chambers in series, means providing for the withdrawal of concentrate from the lower portion of the collecting and concentrating chambers and the passage thereof through the reaction chambers, and means for passing a part of the concentrate from the reaction chambers to the collecting and concentrating chambers from which withdrawn, and a second part to the collecting and concentrating chambers next in series.

9. Apparatus of the class described comprising a battery of two or more sections, each section comprising a reaction chamber and a substantially conical-shaped collecting and concentrating chamber associated with the lower part of the reaction chamber, means for introducing suspension into at least one of the sections, means for transporting relatively concentrated suspension from the lower portions of the collecting and concentrating chambers, partly back to the tops of the reaction chambers associated therewith and partly to the adjacent sections of the battery, means providing for the flowing of relatively dilute suspension from the upper portions of the collecting and concentrating chambers through these collecting and concentrating chambers in series, and means providing for the passage of gas through the reaction chambers in series in contact with the suspension flowing therethrough.

GUSTAF HAGLUND.